(12) United States Patent
Ratzlaff

(10) Patent No.: US 11,318,874 B2
(45) Date of Patent: May 3, 2022

(54) DUMP TRUCK LOAD DIVERTER

(71) Applicant: Roy Ratzlaff, Cle Elum, WA (US)

(72) Inventor: Roy Ratzlaff, Cle Elum, WA (US)

( * ) Notice: Subject to any disclaimer, the term of this patent is extended or adjusted under 35 U.S.C. 154(b) by 296 days.

(21) Appl. No.: 16/751,050

(22) Filed: Jan. 23, 2020

(65) Prior Publication Data

US 2021/0229585 A1 Jul. 29, 2021

(51) Int. Cl.
*B60P 1/28* (2006.01)
*B62D 33/027* (2006.01)

(52) U.S. Cl.
CPC ............ *B60P 1/28* (2013.01); *B62D 33/0273* (2013.01)

(58) Field of Classification Search
CPC .................................... B60P 1/00; B60P 1/28
USPC ................. 298/1 r, 17.7, 7, 17 r, 1 b, 8, 23 r
See application file for complete search history.

(56) References Cited

U.S. PATENT DOCUMENTS

| | | | |
|---|---|---|---|
| 1,548,255 A | 8/1925 | Chenoweth | |
| 1,597,105 A | 8/1926 | Pardee | |
| 2,878,053 A | 3/1959 | Yuncker | |
| 3,729,230 A | 4/1973 | Tomlinson, Jr. et al. | |
| 3,732,960 A * | 5/1973 | Turner | B65G 11/186 193/5 |
| 4,317,592 A | 3/1982 | Newman et al. | |
| 5,992,561 A * | 11/1999 | Holben | E04B 1/84 181/295 |
| 6,074,159 A | 6/2000 | Scharf et al. | |
| 6,764,138 B1 | 7/2004 | Johnas | |
| 7,419,126 B2 * | 9/2008 | Gibson | F16M 13/025 248/220.1 |
| D906,222 S * | 12/2020 | Ratzlaff | D12/400 |

* cited by examiner

*Primary Examiner* — D Glenn Dayoan
*Assistant Examiner* — Sunsurraye Westbrook
(74) *Attorney, Agent, or Firm* — Seed IP Law Group LLP

(57) ABSTRACT

Devices and related methods are disclosed for redirecting gravel, sand or other loads of a dump truck upon discharge from the dump truck. For example, a dump truck load diverter is disclosed which includes a diverter body having a tetrahedral-esque form factor defined by four primary faces and a plurality of chamfer faces, the four primary faces consisting of a primary diverting face, a pair of secondary diverting faces and a base face, the pair of secondary diverting faces being arranged perpendicularly to each other and to the base face. The diverter body may be sized relative to a bed of a dump truck to obstruct a substantial portion of a dump passage area when positioned in one of a plurality of load spreading configurations.

34 Claims, 8 Drawing Sheets

DUMP TRUCK LOAD DIVERTER

BACKGROUND

Technical Field

This disclosure generally relates to devices for redirecting gravel, sand or other loads of a dump truck upon discharge from the dump truck, and related methods.

Description of the Related Art

Gravel, sand and other materials are often hauled in a dump truck to a site of interest and then discharged from the dump truck. In some instances, it is beneficial to spread such materials in a generally uniform manner across a surface. This may be accomplished by slowly driving the dump truck as the material is discharged from a dump end of a bed of the dump truck.

Various devices are known for assisting in redirecting gravel, sand or other loads of a dump truck upon discharge. Such devices include those shown and described in U.S. Pat. Nos. 2,878,053; 3,729,230; 4,317,592; 6,764,138. Such devices, however, may be overly complex or suffer from various other deficiencies and drawbacks.

BRIEF SUMMARY

Embodiments described herein provide devices for redirecting gravel, sand or other loads of a dump truck upon discharge from the dump truck in a particularly efficient and versatile form factor. Related methods are also provided.

According to one example embodiment, a dump truck load diverter for redirecting gravel, sand or other loads of a dump truck upon discharge from the dump truck may be summarized as including: a diverter body having a tetrahedral-esque form factor defined by four primary faces and a plurality of chamfer faces, the four primary faces consisting of a primary diverting face, a pair of secondary diverting faces and a base face, the pair of secondary diverting faces being arranged perpendicularly to each other and to the base face. Furthermore, the diverter body may be sized relative to a bed of the dump truck to obstruct a substantial portion of a dump passage area (e.g., at least ten percent, at least twenty percent or at least thirty percent) when positioned in one of a plurality of load spreading configurations.

For example, in some instances, the diverter body may be sized relative to the bed of the dump truck to obstruct at least twenty percent of a lower dump edge of the bed when the dump truck load diverter is positioned with the primary diverting face down against a floor of the bed and with the base face oriented toward a dump end of the bed. In some instances, the diverter body may be sized relative to the bed of the dump truck to obstruct at least fifty percent of a lower dump edge of the bed when the dump truck load diverter is positioned with the base face against a side of the bed and with one of the secondary diverting faces toward a dump end of the bed. In some instances, the diverter body may be sized relative to the bed of the dump truck to obstruct at least twenty percent of a lower dump edge of the bed when the dump truck load diverter is positioned with one of the secondary diverting faces against a side of the bed, the other one of the secondary diverting faces against a floor of the bed, and the base face oriented towards a dump end of the bed.

Furthermore, the diverter body may be configured such that, with one of the secondary diverting faces positioned against a side of the bed and the other one of the secondary diverting faces positioned against a floor of the bed, and with the base face oriented toward a dump end of the bed, the primary diverting face extends at an oblique angle from an edge of the bed in a mid-region of the bed to a central region of the dump end of the bed to divert a load of the dump truck toward a center of the dump passage area. The diverter body may also be configured such that, with the base face positioned against a side of the bed near the dump passage area and with one of the secondary diverting faces oriented toward a dump end of the bed and the other one of the secondary diverting faces positioned against a floor of the bed, the primary diverting face extends at an oblique angle from the side of the bed toward an opposing side of the bed to divert a load of the dump truck toward an end of the dump passage area. The diverter body may also be configured such that, with the primary diverting face positioned against a floor of the bed in a central location of the bed and with the base face oriented toward a dump end of the bed, each of the secondary diverting faces extend at an oblique angle from a midline of the bed in a mid-region of the bed toward a respective side of the bed to divert a load of the dump truck away from a center of the dump passage area.

The diverter body may be configured to be positionable in each of at least the following load spreading configurations: a side bed spreading configuration; a center bed spreading configuration; and a split bed spreading configuration. The center bed spreading configuration may be characterized by one of the secondary diverting faces being positioned against a side of the bed, the other one of the secondary diverting faces being positioned against a floor of the bed, and the base face being oriented toward a dump end of the bed. The side bed spreading configuration may be characterized by the base face being positioned against a side of the bed near the dump passage area, one of the secondary diverting faces being oriented toward a dump end of the bed, and the other one of the secondary diverting faces being positioned against a floor of the bed. The split bed spreading configuration may be characterized by the primary diverting face being positioned against a floor of the bed in a central location of the bed and the base face being oriented toward a dump end of the bed.

The diverter body may comprise an inclination angle between the primary diverting face and one of the chamfer faces, which is located opposite the primary diverting face, of between about twenty degrees and about thirty-five degrees, or between twenty-five degrees and thirty degrees.

The diverter body may comprise an overall length that is between about twenty percent and about fifty percent of a length of the bed of the dump truck, between about thirty percent and about fifty percent, or between about forty percent and about fifty percent. The diverter body may comprise, for example, an overall length that is between about fifty inches and about ninety inches, between about sixty inches and about eighty inches, between about sixty-five inches and about seventy-five inches, or about seventy inches.

The diverter body may comprise an overall height that is at least twenty percent of a depth of the bed of the dump truck, between about twenty percent and about seventy percent of a depth of the bed of the dump truck, or between about twenty percent and about fifty percent of a depth of the bed of the dump truck. The diverter body may comprise, for example, an overall height that is between about twelve inches and about thirty inches, between about fifteen inches and about twenty-five inches, between about seventeen inches and about twenty inches, or about eighteen inches.

The diverter body may comprise an overall width that is between about twenty percent and about fifty percent of a width of the bed of the dump truck, between about thirty percent and about forty percent, or about thirty-five percent. The diverter body may comprise, for example, an overall width that is between about thirty inches and about fifty inches, between about thirty-five inches and about forty-five inches, or about forty inches.

The diverter body may comprise a hollow body or a shell structure. For example, the diverter body may comprise sheet material that is welded together into a hollow, shell structure. In other instances, the diverter body may comprise a hollow, molded shell structure.

The dump truck load diverter may further comprise one or more handles integrally formed in the body for repositioning the dump truck load diverter within the bed of the dump truck. Each of the one or more handles may be recessed within the diverter body.

A dump truck load diverter system may also be provided that includes a dump truck load diverter as described herein and a holding device configured to removably receive the dump truck load diverter for storage. Advantageously, the holding device may be configured to removably receive the dump truck load diverter with a vertex of the dump truck load diverter located opposite the base face oriented downward, and such that the dump truck load diverter is held in place by gravity.

According to another embodiment, a method of discharging a load from a dump truck may be summarized as including: positioning a dump truck load diverter in one of a plurality of load spreading configurations, the dump truck load diverter including a diverter body having a tetrahedral-esque form factor defined by four primary faces and a plurality of chamfer faces, the four primary faces consisting of a primary diverting face, a pair of secondary diverting faces and a base face, the pair of secondary diverting faces being arranged perpendicularly to each other and to the base face, and wherein the diverter body is sized relative to the bed of the dump truck to obstruct a substantial portion of a dump passage area (e.g., at least ten percent, at least twenty percent or at least thirty percent); and discharging at least a portion of the load from the bed of the dump truck, whereby the dump truck load diverter causes the load to discharge in a specific manner associated with the load spreading configuration in which the dump truck load diverter is positioned.

Positioning the dump truck load diverter in one of the plurality of load spreading configurations may include, for example, positioning the dump truck load diverted in one of the following load spreading configurations: a side bed spreading configuration; a center bed spreading configuration; and a split bed spreading configuration.

The center bed spreading configuration may be characterized by one of the secondary diverting faces being positioned against a side of the bed, the other one of the secondary diverting faces being positioned against a floor of the bed, and the base face being oriented toward a dump end of the bed. The center bed spreading configuration may be characterized by the dump truck load diverter causing the load to discharge from a central area of a dump end of the bed.

The side bed spreading configuration may be characterized by the base face being positioned against a side of the bed near the dump passage area, one of the secondary diverting faces being oriented toward a dump end of the bed, and the other one of the secondary diverting faces being positioned against a floor of the bed. The side bed spreading configuration is characterized by the dump truck load diverter causing the load to discharge from one lateral side area of a dump end of the bed.

The split bed spreading configuration may be characterized by the primary diverting face being positioned against a floor of the bed in a central location of the bed and the base face being oriented toward a dump end of the bed. The split bed spreading configuration may be characterized by the dump truck load diverter causing the load to discharge from opposing lateral side areas of a dump end of the bed.

The method may further include storing the dump truck load diverter in a holding device under the force of gravity. Storing the dump truck load diverter may include, for example, storing the dump truck load diverter with a vertex of the dump truck load diverter located opposite the base face oriented downward.

DETAILED DESCRIPTION

In the following description, certain specific details are set forth in order to provide a thorough understanding of various disclosed embodiments. However, one of ordinary skill in the relevant art will recognize that embodiments may be practiced without one or more of these specific details. In other instances, well-known devices, systems and processes associated with discharging a load (e.g., gravel, sand) from a dump truck may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein provide devices and related methods for discharging a load from a dump truck.

Figure 1:
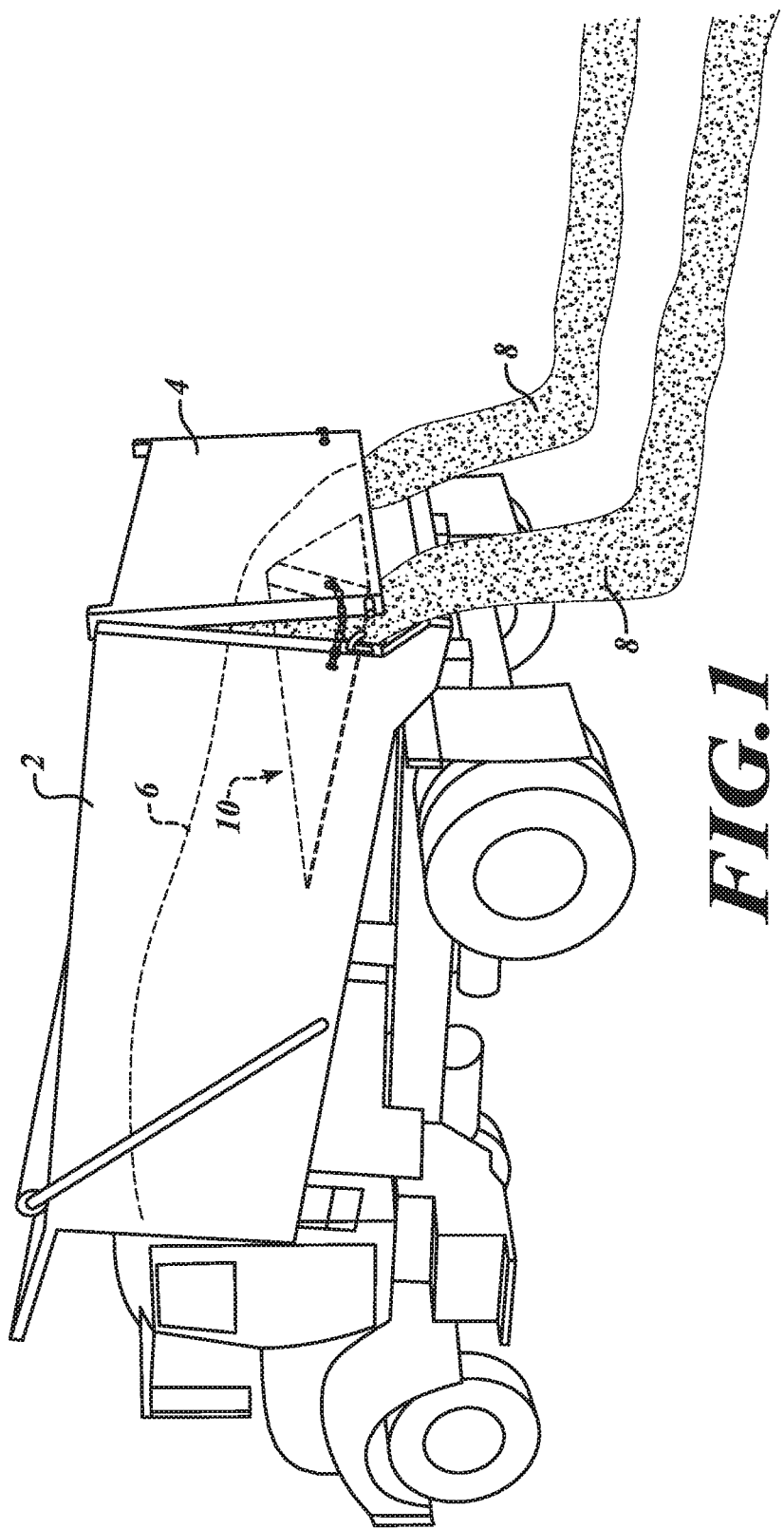
FIG. 1 shows a perspective view of a dump truck load diverter, according to one example embodiment, positioned within a bed of a conventional dump truck in a split bed spreading configuration, wherein the dump truck load diverter causes the load to discharge from opposing lateral sides of a dump end of the bed.
Figure 2:
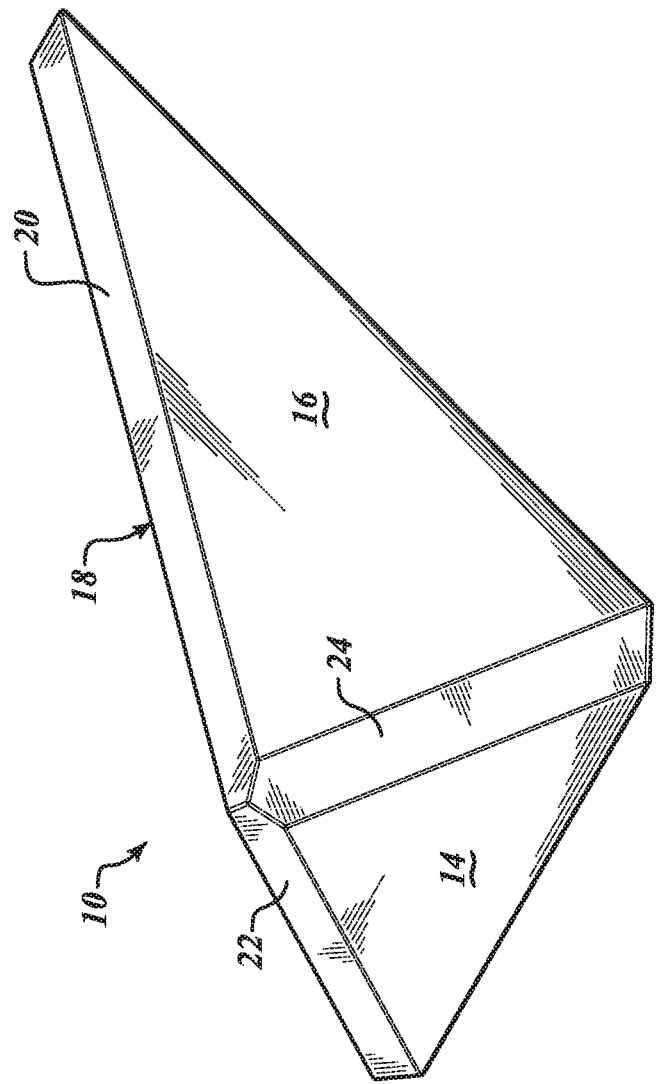
FIG. 2 shows an isometric view of the dump truck load diverter of FIG. 1 apart from the dump truck.
Figure 3:
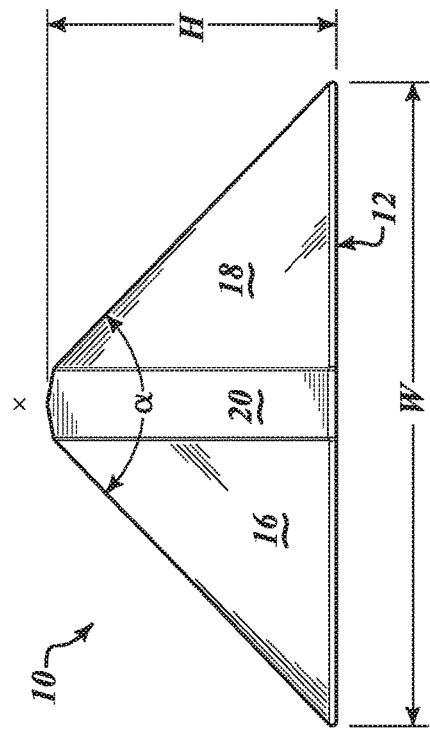
FIG. 3 shows a front elevational view of the dump truck load diverter of FIG. 1.
Figure 4:
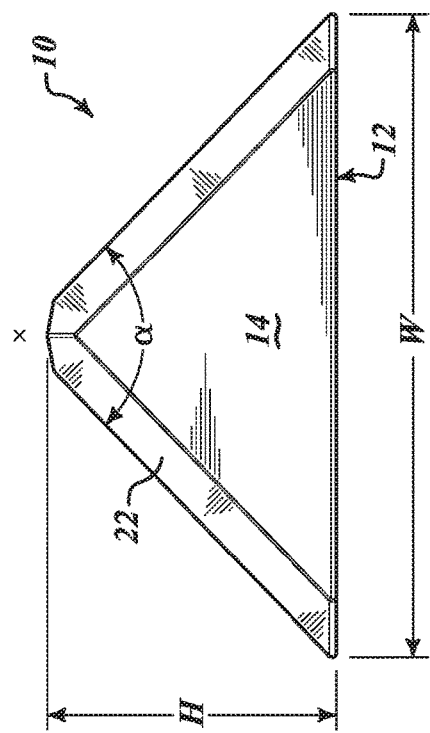
FIG. 4 shows a rear elevational view of the dump truck load diverter of FIG. 1.
Figure 5:
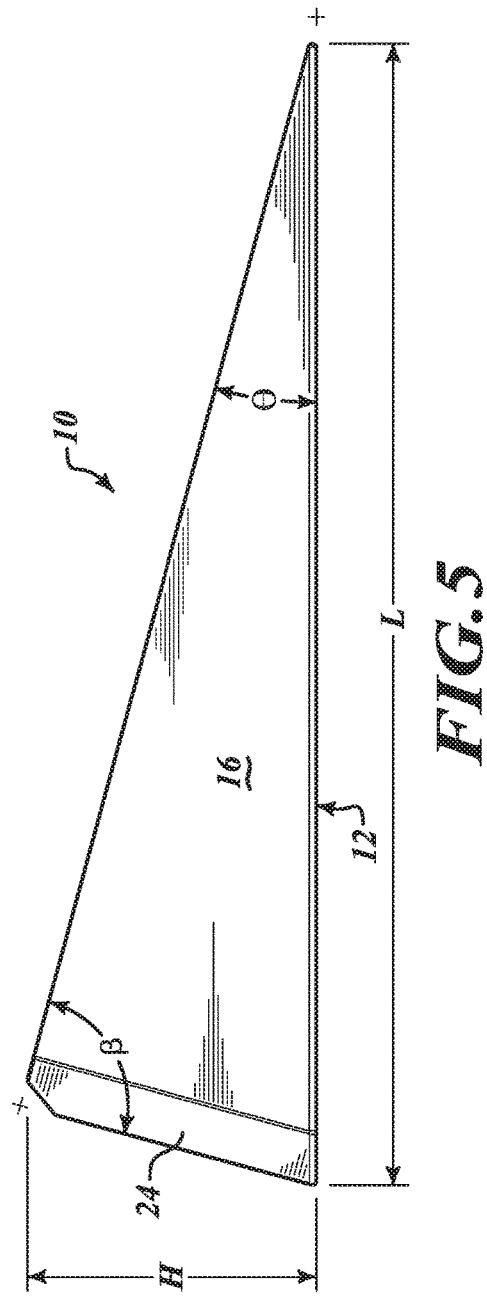
FIG. 5 shows a side elevational view of the dump truck load diverter of FIG. 1.
Figure 6:
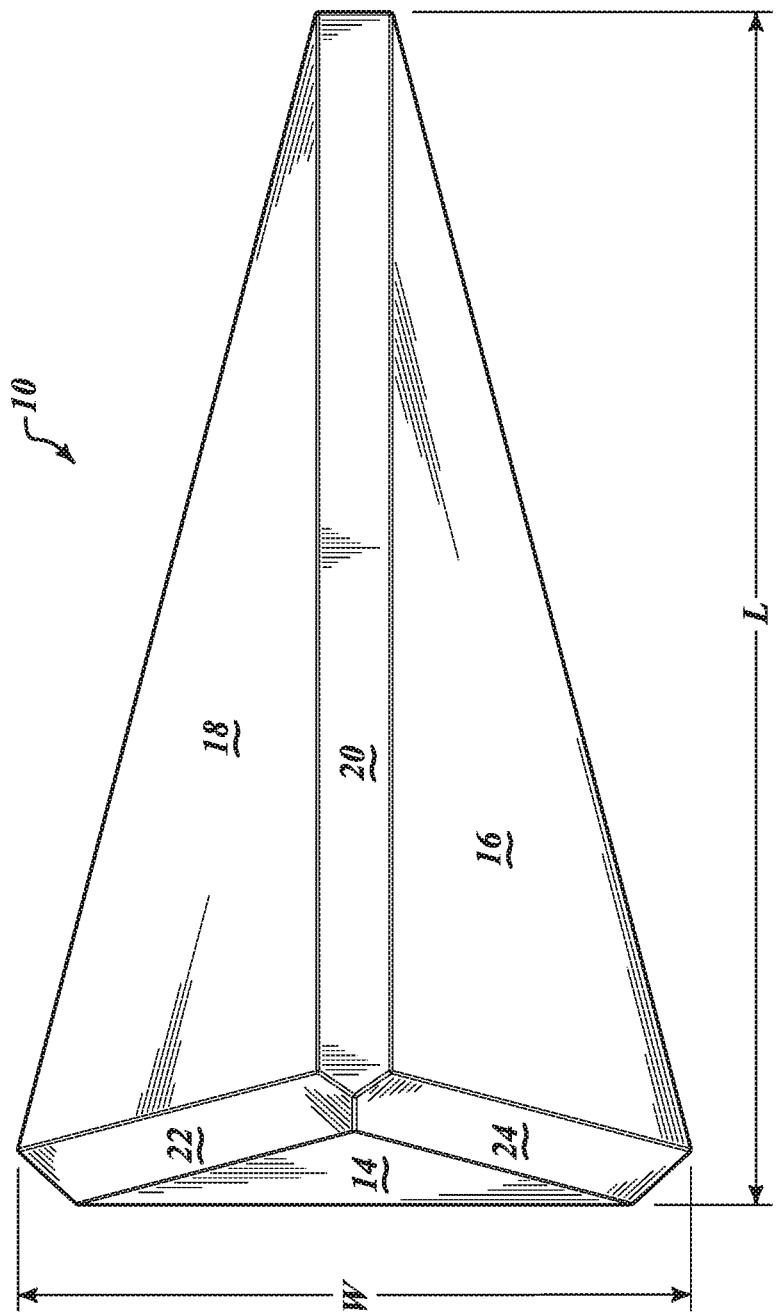
FIG. 6 shows a top plan view of the dump truck load diverter of FIG. 1.
Figure 7:
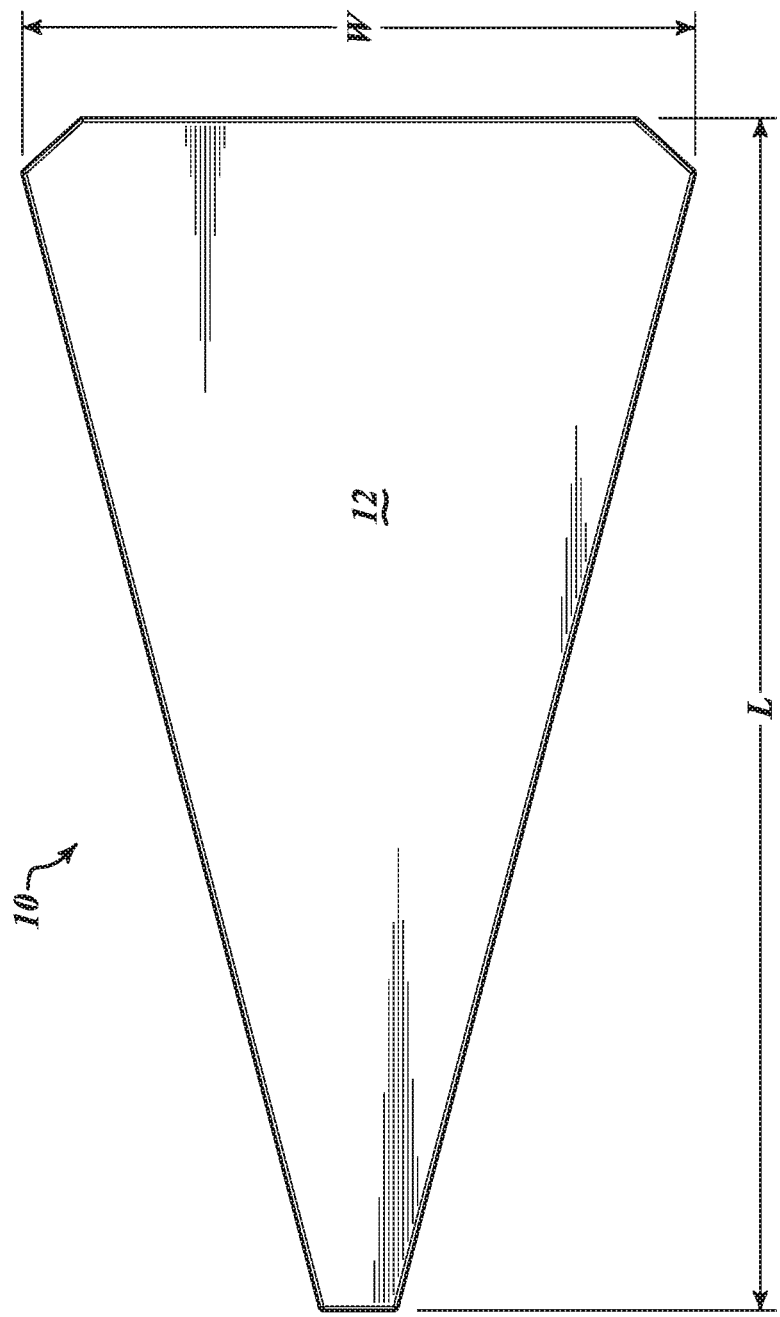
FIG. 7 shows a bottom plan view of the dump truck load diverter of FIG. 1.

FIGS. 1 through 7 show one example embodiment of a dump truck load diverter 10 to assist in dumping a load 6 from a bed 2 of a dump truck, wherein: FIG. 1 shows the dump truck load diverter 10 positioned within the bed 2 of a conventional dump truck in a split bed spreading configuration, wherein the dump truck load diverter 10 causes the load to discharge in parallel streams 8 from opposing lateral side areas of the dump end 4 of the bed 2; FIG. 2 shows an isometric view of the dump truck load diverter 10 apart from the dump truck; FIG. 3 shows a front elevational view thereof; FIG. 4 shows a rear elevational view thereof; FIG. 5 shows a side elevational view thereof; FIG. 6 shows a top plan view thereof; and FIG. 7 shows a bottom plan view thereof. Notably, the dump truck load diverter 10 may be conveniently positioned in one of a plurality of different load spreading configurations, including those illustrated in FIGS. 8A-8C.

With reference to the example embodiment illustrated in FIGS. 2 through 7, the dump truck load diverter 10 may be summarized as including: a diverter body that comprises or consists of a tetrahedral or tetrahedral-esque form factor defined by four primary faces 12, 14, 16, 18 and a plurality of chamfer faces 20, 22, 24, the four primary faces consisting of a primary diverting face 12, a pair of secondary diverting faces 16, 18 and a base face 14. A tetrahedral-esque form factor means that the general shape of the dump truck load diverter 10 resembles that of a tetrahedron (or triangular pyramid). According to the illustrated embodiment, the pair of secondary diverting faces 16, 18 may be arranged perpendicularly to each other and to the base face 14, such that angle α in FIGS. 3 and 4 and the angle β in FIG. 5 are each ninety degrees. In other instances, these angles may be non-orthogonal. The chamfer faces 20, 22, 24 may be on the order of at least one, two, three, four or five inches in width.

The diverter body is advantageously sized relative to the bed 2 of a conventional dump truck (FIG. 1) to obstruct a substantial portion of a dump passage area (e.g., at least ten percent, at least twenty percent or at least thirty percent) when positioned in one of a plurality of load spreading configurations, such as the load spreading configurations illustrated in FIGS. 8A-8D. The dump passage area is the area formed at the dump end 4 of the bed 2 by the profile of the bed and a partially opened gate structure, which may be selectively chained or otherwise set to a desired opening size (as is well known in the industry).

Figure 8A:
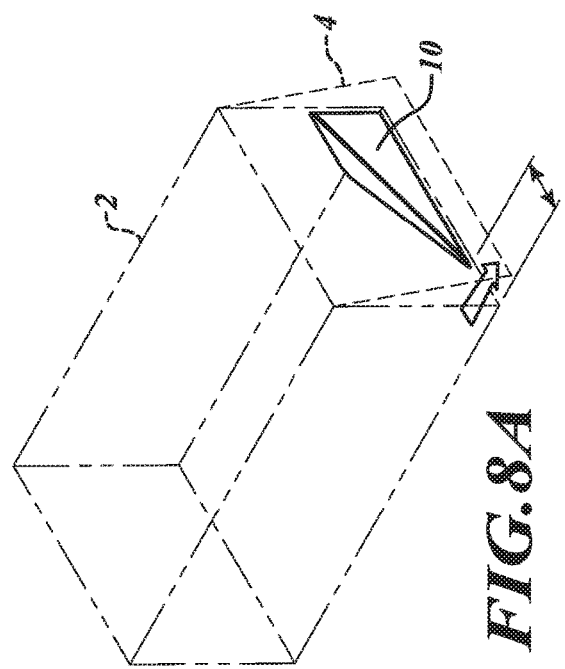
FIGS. 8A-8D illustrate different load spreading configurations in which a dump truck load diverter may be positioned, according to embodiments of the present invention.
Figure 8B:
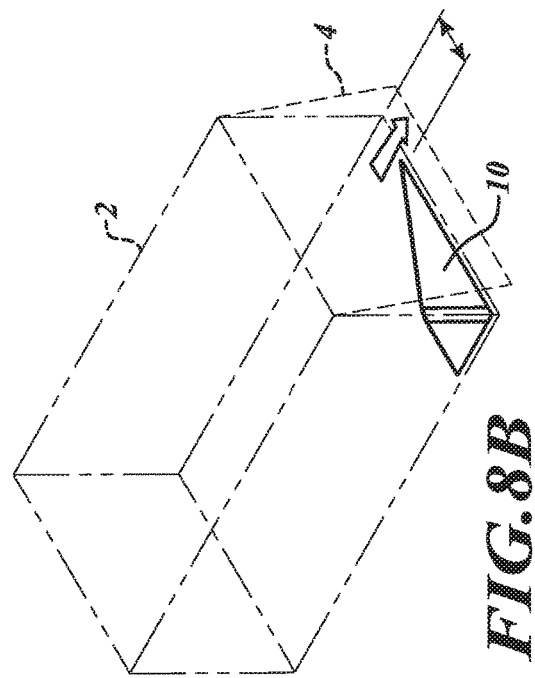
Figure 8C:
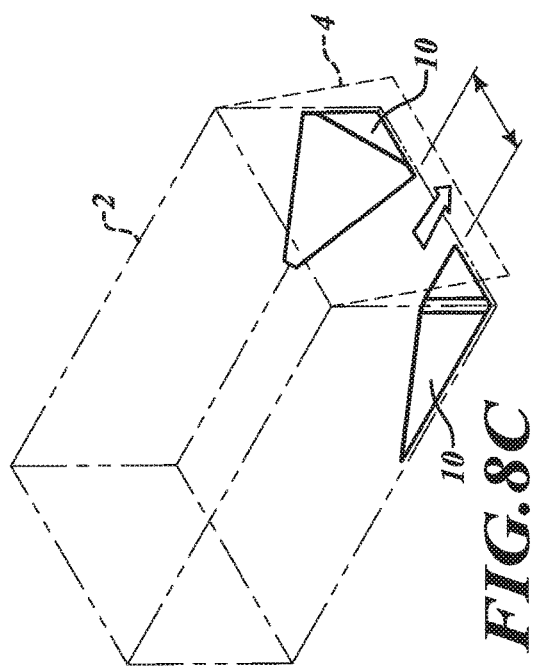
Figure 8D:
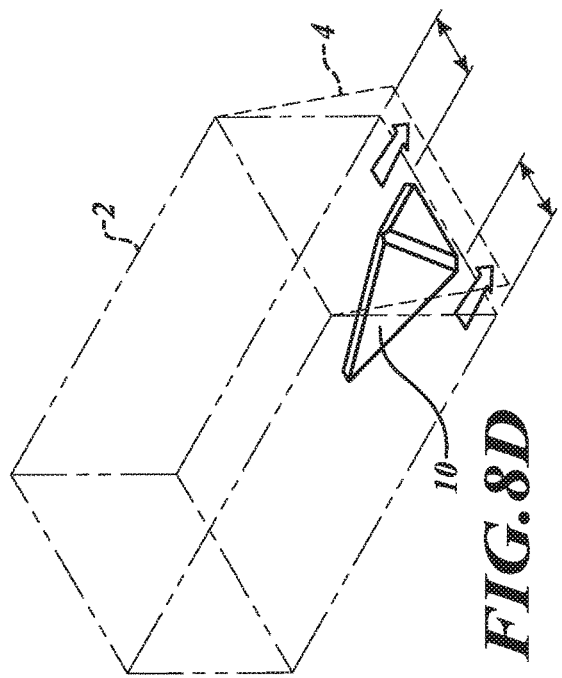

The diverter body may be sized relative to the bed 2 of the dump truck, for example, to obstruct at least twenty percent of a lower dump edge of the bed 2 when the dump truck load diverter 10 is positioned with the primary diverting face 12 down against a floor of the bed 2 and with the base face 14 oriented toward the dump end 4 of the bed 2, as illustrated, for example, in FIG. 8D. As another example, the diverter body may be sized relative to the bed 2 of the dump truck to obstruct at least fifty percent of a lower dump edge of the bed 2 when the dump truck load diverter 10 is positioned with the base face 14 against a side of the bed 2 and with one of the secondary diverting faces 16, 18 toward the dump end 4 of the bed 2, as illustrated, for example, in FIGS. 8A and 8B. As yet another example, the diverter body may be sized relative to the bed 2 of the dump truck to obstruct at least twenty percent of a lower dump edge of the bed 2 when the dump truck load diverter 10 is positioned with one of the secondary diverting faces 16, 18 against a side of the bed, the other one of the secondary diverting faces 16, 18 against a floor of the bed, and the base face 14 oriented towards the dump end 4 of the bed 2, as illustrated, for example, in FIG. 8C.

The diverter body may be configured such that, with one of the secondary diverting faces 16, 18 positioned against a side of the bed 2 and the other one of the secondary diverting faces 16, 18 positioned against a floor of the bed, and with the base face 14 oriented toward the dump end 4 of the bed 2, the primary diverting face 12 extends at an oblique angle from an edge of the bed 2 in a mid-region of the bed 2 to a central region of the dump end 4 of the bed 2 to divert a load 6 of the dump truck toward a center of the dump passage area, as illustrated, for example, in FIG. 8C.

The diverter body may be configured such that, with the base face 14 positioned against a side of the bed 2 near the dump passage area and with one of the secondary diverting faces 16, 18 oriented toward the dump end 4 of the bed 2 and the other one of the secondary diverting faces 16, 18 positioned against a floor of the bed 2, the primary diverting face 12 extends at an oblique angle from the side of the bed 2 toward an opposing side of the bed 2 to divert a load 6 of the dump truck toward one end of the dump passage area, as illustrated, for example, in FIGS. 8A and 8B.

The diverter body may be configured such that, with the primary diverting face 12 positioned against a floor of the bed 2 in a central location of the bed 2 and with the base face 14 oriented toward the dump end 4 of the bed, each of the secondary diverting faces 16, 18 extend at an oblique angle from a midline of the bed 2 in a mid-region of the bed 2 toward a respective side of the bed 2 to divert a load 6 of the dump truck away from a center of the dump passage area, as illustrated for example, in FIG. 8D.

Advantageously, the diverter body may be configured to be positionable in each of at least the following load spreading configurations: a side bed spreading configuration (FIGS. 8A and 8B); a center bed spreading configuration (FIG. 8C); and a split bed spreading configuration (FIG. 8D).

As illustrated in FIG. 8C, the center bed spreading configuration may be characterized by one of the secondary diverting faces 16, 18 being positioned against a side of the bed 2, the other one of the secondary diverting faces 16, 18 being positioned against a floor of the bed 2, and the base face 14 being oriented toward the dump end 4 of the bed 2. As illustrated in FIGS. 8A and 8B, the side bed spreading configuration may be characterized by the base face 14 being positioned against a side of the bed 2 near the dump passage area, one of the secondary diverting faces 16, 18 being oriented toward the dump end 4 of the bed 2, and the other one of the secondary diverting faces 16, 18 being positioned against a floor of the bed 2. As illustrated in FIG. 8D, the split bed spreading configuration may be characterized by the primary diverting face 12 being positioned against a floor of the bed 2 in a central location of the bed 2 and the base face 14 being oriented toward the dump end 4 of the bed 2.

With reference to FIG. 5, the diverter body may in some instances comprise an inclination angle θ between the primary diverting face 12 and one of the chamfer faces 20, which is located opposite the primary diverting face 12, of between about twenty degrees and about thirty-five degrees, or between twenty-five degrees and thirty degrees.

With continued reference to FIG. 5, the diverter body may comprise an overall length L that is between about twenty percent and about fifty percent of a length of the bed 2 of the dump truck, between about thirty percent and about fifty percent, or between about forty percent and about fifty percent. The diverter body may comprise, for example, an overall length L that is between about fifty inches and about ninety inches, between about sixty inches and about eighty inches, between about sixty-five inches and about seventy-five inches, or about seventy inches.

With reference to FIGS. 3 and 4, the diverter body may comprise an overall height H that is at least twenty percent of a depth of the bed 2 of the dump truck, between about twenty percent and about seventy percent, or between about twenty percent and about fifty percent. The diverter body may comprise, for example, an overall height H that is between about twelve inches and about thirty inches, between about fifteen inches and about twenty-five inches, between about seventeen inches and about twenty inches, or about eighteen inches.

With continued reference to FIGS. 3 and 4, the diverter body may comprise an overall width W that is between about twenty percent and about fifty percent of a width of the bed 2 of the dump truck, between about thirty percent and about forty percent, or about thirty-five percent. The diverter body may comprise, for example, an overall width W that is between about thirty inches and about fifty inches, between about thirty-five inches and about forty-five inches, or about forty inches.

In some advantageous embodiments, the diverter body may comprise a hollow body or a shell structure. For example, the diverter body may comprise sheet material (e.g., aluminum sheet material) that is welded together into a hollow, shell structure. In other instances, the diverter body may comprise a hollow molded shell structure (e.g., rigid molded plastic shell structure).

Figure 9:
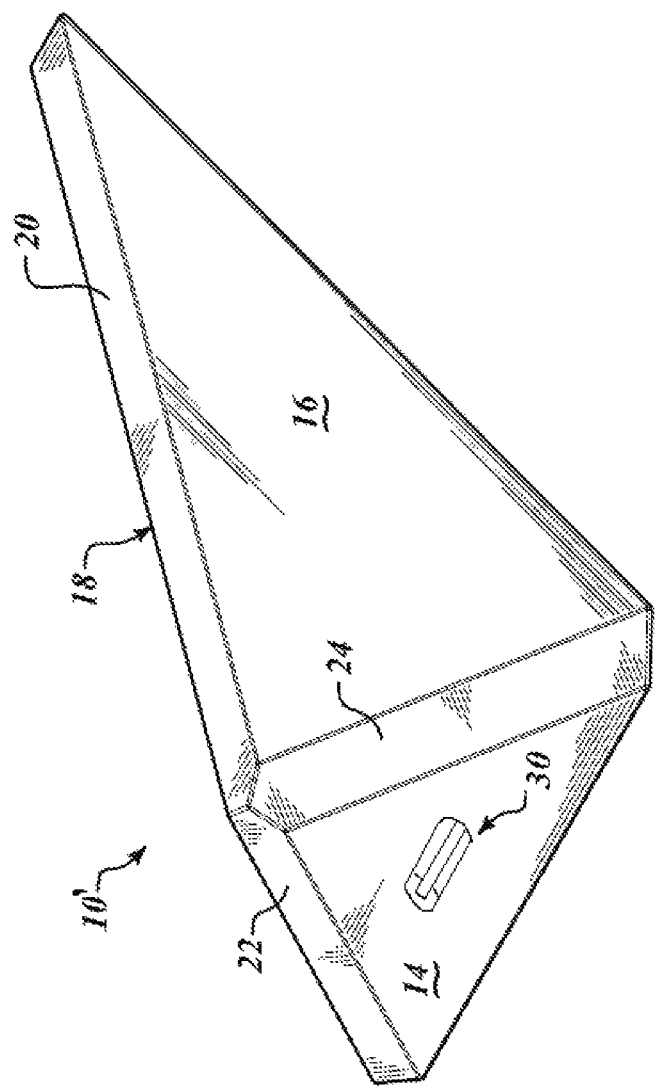
FIG. 9 shows an isometric view of a variant of the dump truck load diverter of FIG. 1 having at least one handle to assist in positioning the dump truck load diverter for use.

With reference to FIG. 9, the dump truck load diverter 10' may further comprise one or more handles 30 integrally formed in the body to assist in repositioning the dump truck load diverter 10' within the bed 2 of the dump truck, such as, for example, between the different spreading positions disclosed herein. Each of the one or more handles 30 may be recessed within the diverter body, or may alternatively project from the diverter body.

According to embodiments of the present invention, methods of discharging a load from a dump truck are also provided. An example method may include: positioning a dump truck load diverter 10 in one of a plurality of load spreading configurations, such as those illustrated in FIGS. 8A-8D; and discharging at least a portion of a load 6 from the bed 2 of the dump truck, whereby the dump truck load diverter 10 causes the load 6 to discharge in a specific manner associated with the load spreading configuration in which the dump truck load diverter 10 is positioned, such as, for example, in a central stream, a side stream or opposing side streams. As can be appreciated from the disclosure above, positioning the dump truck load diverter 10 in one of the plurality of load spreading configurations may include, for example, positioning the dump truck load diverted in one of the following load spreading configurations: the side bed spreading configuration illustrated in FIGS. 8A and 8B; the center bed spreading configuration illustrated in FIG. 8C; and the split bed spreading configuration illustrated in FIG. 8D.

Figure 10:
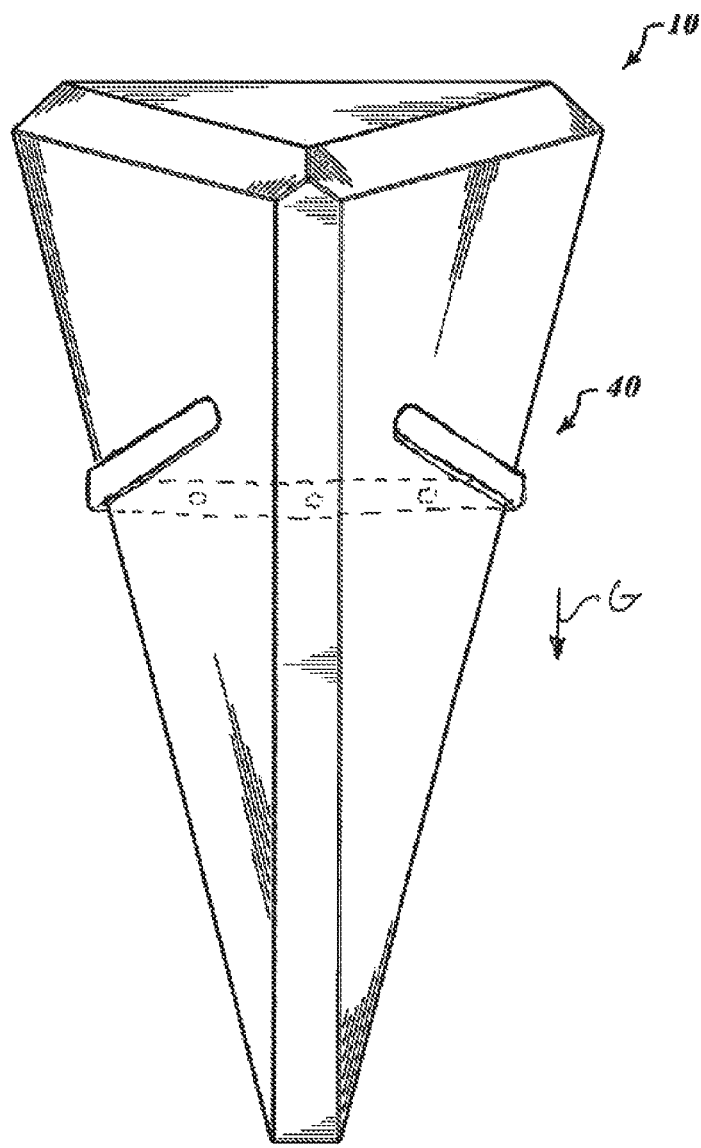
FIG. 10 shows an elevational view of the dump truck load diverter of FIG. 1 stored in a holding device, according to an example embodiment.

The method may further include storing the dump truck load diverter 10 in a holding device 40 under the force of gravity G, as shown, for example, in FIG. 10. As shown in FIG. 10, storing the dump truck load diverter 10 may include storing the dump truck load diverter 10 with a vertex of the dump truck load diverter 10 that is located opposite the base face oriented downward.

The holding device 40 may be configured as a formed bar structure that includes a receiving profile that mates with or nests with a portion of the dump truck load diverter 10 as shown in FIG. 10 so as to hangedly receive the dump truck load diverter 10 under the force of gravity G. The holding device 40 may be secured to an inside wall of the bed 2 of the dump truck such that the dump truck load diverter 10 may be conveniently stored within the bed 2 during transport or when the dump truck load diverter 10 is otherwise not in use.

Although the holding device 40 is illustrated in FIG. 10 as a single piece, it is also appreciated that the holding device may be provided in multiple pieces, such as, for example, two sloping, steel angles fixedly attached to the inside of the bed 2 (also referred to as a dump box). Still further, it is appreciated that the holding device 40 may take on various other form factors to assist in removably securing the dump truck load diverter 10 within the bed 2 of the dump truck. While various fastening devices (e.g., thumb screws, bungee cords, etc.) could also be used to assist in securing the dump truck load diverter 10 in place, it is particularly advantageous to removably secure the dump truck load diverter 10 in place only under the force of gravity for simplicity and ease of use.

Although only four spreading configurations are illustrated in FIGS. 8A-8D, it is appreciated that the dump truck load diverters 10, 10' disclosed herein may be positioned in a variety of other configurations, and may be used alone or in combination with other diverting structures or features to assist in discharging a load from a dump truck.

In addition, although the example embodiments of the dump truck load diverters 10, 10' illustrated herein are shown as including planar surfaces, it is appreciated that one or more surfaces may be non-planar, such as concave surfaces or complex surfaces.

Furthermore, although the devices and methods described herein are discussed primarily in the context of discharging a load from a dump truck, it is appreciated that the devices described herein, or aspects thereof, may be used for other purposes.

Moreover, aspects and features of the embodiments described above may be combined in any suitable manner to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A dump truck load diverter, comprising:
 a diverter body having a tetrahedral-esque form factor defined by four primary faces and a plurality of chamfer faces, the four primary faces consisting of a primary diverting face, a pair of secondary diverting faces and a base face, the pair of secondary diverting faces being arranged perpendicularly to each other and to the base face, and wherein the diverter body is sized relative to a bed of a dump truck to obstruct a substantial portion of a dump passage area when positioned in one of a plurality of load spreading configurations.

2. The dump truck load diverter of claim 1, wherein the diverter body is sized relative to the bed of the dump truck to obstruct at least twenty percent of a lower dump edge of the bed when the dump truck load diverter is positioned with the primary diverting face down against a floor of the bed and with the base face oriented toward a dump end of the bed.

3. The dump truck load diverter of claim 1, wherein the diverter body is sized relative to the bed of the dump truck to obstruct at least fifty percent of a lower dump edge of the bed when the dump truck load diverter is positioned with the base face against a side of the bed and with one of the secondary diverting faces toward a dump end of the bed.

4. The dump truck load diverter of claim 1, wherein the diverter body is sized relative to the bed of the dump truck to obstruct at least twenty percent of a lower dump edge of the bed when the dump truck load diverter is positioned with one of the secondary diverting faces against a side of the bed, the other one of the secondary diverting faces against a floor of the bed, and the base face oriented towards a dump end of the bed.

5. The dump truck load diverter of claim 1, wherein the diverter body is configured such that, with one of the secondary diverting faces positioned against a side of the bed and the other one of the secondary diverting faces positioned against a floor of the bed, and with the base face oriented toward a dump end of the bed, the primary diverting face extends at an oblique angle from an edge of the bed in a mid-region of the bed to a central region of the dump end of the bed to divert a load of the dump truck toward a center of the dump passage area.

6. The dump truck load diverter of claim 1, wherein the diverter body is configured such that, with the base face positioned against a side of the bed near the dump passage area and with one of the secondary diverting faces oriented toward a dump end of the bed and the other one of the secondary diverting faces positioned against a floor of the bed, the primary diverting face extends at an oblique angle from the side of the bed toward an opposing side of the bed to divert a load of the dump truck toward an end of the dump passage area.

7. The dump truck load diverter of claim 1, wherein the diverter body is configured such that, with the primary diverting face positioned against a floor of the bed in a central location of the bed and with the base face oriented toward a dump end of the bed, each of the secondary diverting faces extend at an oblique angle from a midline of the bed in a mid-region of the bed toward a respective side of the bed to divert a load of the dump truck away from a center of the dump passage area.

8. The dump truck load diverter of claim 1, wherein the diverter body is configured to be positionable in each of at least the following load spreading configurations:
  a side bed spreading configuration;
  a center bed spreading configuration; and
  a split bed spreading configuration.

9. The dump truck load diverter of claim 8, wherein the center bed spreading configuration is characterized by one of the secondary diverting faces being positioned against a side of the bed, the other one of the secondary diverting faces being positioned against a floor of the bed, and the base face being oriented toward a dump end of the bed.

10. The dump truck load diverter of claim 8, wherein the side bed spreading configuration is characterized by the base face being positioned against a side of the bed near the dump passage area, one of the secondary diverting faces being oriented toward a dump end of the bed, and the other one of the secondary diverting faces being positioned against a floor of the bed.

11. The dump truck load diverter of claim 8, wherein the split bed spreading configuration is characterized by the primary diverting face being positioned against a floor of the bed in a central location of the bed and the base face being oriented toward a dump end of the bed.

12. The dump truck load diverter of claim 1, wherein the diverter body comprises an inclination angle between the primary diverting face and one of the chamfer faces, which is located opposite the primary diverting face, of between about twenty degrees and about thirty-five degrees.

13. The dump truck load diverter of claim 1, wherein the diverter body comprises an overall length that is between about twenty percent and about fifty percent of a length of the bed of the dump truck.

14. The dump truck load diverter of claim 1, wherein the diverter body comprises an overall length that is between about fifty inches and about ninety inches.

15. The dump truck load diverter of claim 1, wherein the diverter body comprises an overall height that is between about twenty percent and about fifty percent of a depth of the bed of the dump truck.

16. The dump truck load diverter of claim 1, wherein the diverter body comprises an overall height that is between about twelve inches and about thirty inches.

17. The dump truck load diverter of claim 1, wherein the diverter body comprises an overall width that is between about twenty percent and about fifty percent of a width of the bed of the dump truck.

18. The dump truck load diverter of claim 1, wherein the diverter body comprises an overall width that is between about thirty inches and about fifty inches.

19. The dump truck load diverter of claim 1, wherein the diverter body is a hollow body.

20. The dump truck load diverter of claim 1, wherein the diverter body is a shell structure.

21. The dump truck load diverter of claim 1, further comprising one or more handles integrally formed in the body for repositioning the dump truck load diverter within the bed of the dump truck.

22. The dump truck load diverter of claim 21, wherein each of the one or more handles are recessed within the diverter body.

23. A dump truck load diverter system comprising the dump truck load diverter of claim 1 and a holding device configured to removably receive the dump truck load diverter for storage.

24. The dump truck load diverter system of claim 23, wherein the holding device is configured to removably receive the dump truck load diverter with a vertex of the dump truck load diverter located opposite the base face oriented downward, and such that the dump truck load diverter is held in place by gravity.

25. A method of discharging a load from a bed of a dump truck, the method comprising:
  positioning a dump truck load diverter in one of a plurality of load spreading configurations, the dump truck load diverter including a diverter body having a tetrahedral-esque form factor defined by four primary faces and a plurality of chamfer faces, the four primary faces consisting of a primary diverting face, a pair of secondary diverting faces and a base face, the pair of secondary diverting faces being arranged perpendicularly to each other and to the base face, and wherein the diverter body is sized relative to the bed of the dump truck to obstruct a substantial portion of a dump passage area; and discharging at least a portion of the load from the bed of the dump truck, whereby the dump truck load diverter causes the load to discharge in a manner associated with the load spreading configuration in which the dump truck load diverter is positioned.

26. The method of claim 25, wherein positioning the dump truck load diverter in one of the plurality of load spreading configurations, includes positioning the dump truck load diverted in one of the following load spreading configurations:
 a side bed spreading configuration;
 a center bed spreading configuration; and
 a split bed spreading configuration.

27. The method of claim 26, wherein the center bed spreading configuration is characterized by one of the secondary diverting faces being positioned against a side of the bed, the other one of the secondary diverting faces being positioned against a floor of the bed, and the base face being oriented toward a dump end of the bed.

28. The method of claim 26, wherein the side bed spreading configuration is characterized by the base face being positioned against a side of the bed near the dump passage area, one of the secondary diverting faces being oriented toward a dump end of the bed, and the other one of the secondary diverting faces being positioned against a floor of the bed.

29. The method of claim 26, wherein the split bed spreading configuration is characterized by the primary diverting face being positioned against a floor of the bed in a central location of the bed and the base face being oriented toward a dump end of the bed.

30. The method of claim 26, wherein the center bed spreading configuration is characterized by the dump truck load diverter causing the load to discharge from a central area of a dump end of the bed.

31. The method of claim 26, wherein the side bed spreading configuration is characterized by the dump truck load diverter causing the load to discharge from one lateral side area of a dump end of the bed.

32. The method of claim 26, wherein the split bed spreading configuration is characterized by the dump truck load diverter causing the load to discharge from opposing lateral side areas of a dump end of the bed.

33. The method of claim 25, further comprising:
 storing the dump truck load diverter in a holding device under the force of gravity.

34. The method of claim 33, wherein storing the dump truck load diverter includes storing the dump truck load diverter with a vertex of the dump truck load diverter located opposite the base face oriented downward.

* * * * *